US012620297B2

(12) United States Patent
Nagado et al.

(10) Patent No.: US 12,620,297 B2
(45) Date of Patent: May 5, 2026

(54) TREATMENT DEVICE, TREATMENT METHOD, AND EXHAUST GAS TREATMENT SYSTEM

(71) Applicant: Komatsu Ltd., Tokyo (JP)

(72) Inventors: Yoshitoshi Nagado, Tokyo (JP); Akira Ito, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 18/727,729

(22) PCT Filed: Nov. 8, 2022

(86) PCT No.: PCT/JP2022/041567
§ 371 (c)(1),
(2) Date: Jul. 10, 2024

(87) PCT Pub. No.: WO2023/139894
PCT Pub. Date: Jul. 27, 2023

(65) Prior Publication Data

US 2025/0104547 A1 Mar. 27, 2025

(30) Foreign Application Priority Data

Jan. 21, 2022 (JP) ................................ 2022-007743

(51) Int. Cl.
*G08B 21/12* (2006.01)
*G08B 21/18* (2006.01)

(52) U.S. Cl.
CPC ........... *G08B 21/12* (2013.01); *G08B 21/182* (2013.01)

(58) Field of Classification Search
None
See application file for complete search history.

(56) References Cited

U.S. PATENT DOCUMENTS

| | | | | |
|---|---|---|---|---|
| 2010/0242443 | A1 | 9/2010 | Kodama et al. | |
| 2016/0123207 | A1 | 5/2016 | Aso et al. | |
| 2019/0203628 | A1* | 7/2019 | Su | F01N 3/023 |
| 2019/0323406 | A1 | 10/2019 | Inoue et al. | |

FOREIGN PATENT DOCUMENTS

| | | | |
|---|---|---|---|
| JP | 2009-138704 | A | 6/2009 |
| JP | 2014-234773 | A | 12/2014 |
| JP | 2019-190348 | A | 10/2019 |

* cited by examiner

*Primary Examiner* — Thomas S Mccormack
(74) *Attorney, Agent, or Firm* — Troutman Pepper Locke LLP

(57) ABSTRACT

A treatment device includes an acquisition unit configured to acquire regeneration information, which is information related to a regeneration interval of a filter that collects a particulate matter in an exhaust gas of an engine, and ash information, which is information indicating an estimated value of a deposition amount of ash deposited on the filter, a determination unit configured to determine whether or not the filter needs to be cleaned based on the regeneration information and the estimated value indicated by the ash information, and a notification unit configured to issue a notification that the filter needs to be cleaned in a case where it is determined that the filter needs to be cleaned.

5 Claims, 5 Drawing Sheets

| ATMOSPHERIC DENSITY [kg/m$^3$] | ASH DEPOSITION AMOUNT CORRESPONDING TO ALLOWABLE BACK PRESSURE [g/L] |
|---|---|
| 1.3 | 4.0 |
| 1.2 | 3.5 |
| 1.1 | 3.0 |
| 1.0 | 2.5 |

TREATMENT DEVICE, TREATMENT METHOD, AND EXHAUST GAS TREATMENT SYSTEM

CROSS REFERENCE TO RELATED APPLICATIONS

This application is related to co-pending application: "TREATMENT DEVICE, TREATMENT METHOD, AND EXHAUST GAS TREATMENT SYSTEM" filed even date herewith in the names of Yoshitoshi NAGADO and Akira ITO as a national phase entry of PCT/JP2022/041541, which application is assigned to the assignee of the present application and is incorporated by reference herein.

TECHNICAL FIELD

The present disclosure relates to a treatment device, a treatment method, and an exhaust gas treatment system. Priority is claimed on Japanese Patent Application No. 2022-007743, filed in Japan on Jan. 21, 2022, the content of which is incorporated herein by reference.

BACKGROUND ART

Patent Document 1 discloses an exhaust gas post-treatment device that determines whether or not ash, greater than or equal to a specified amount, is deposited on a filter that collects a particulate matter (PM) included in an exhaust gas. The particulate matter includes soot, an unburned residual fuel, ash (also referred to as "oil ash"), and the like. The ash is a combustion residue of a metal component such as calcium contained in engine oil as an additive. In the device disclosed in Patent Document 1, when the particulate matter is deposited on the filter, a regeneration operation of heating the filter to increase a temperature of the filter and burning and removing the particulate matter deposited on the filter is performed. However, the ash cannot be removed in the regeneration operation. In the device disclosed in Patent Document 1, in a case where an interval for performing the regeneration operation is shortened, it is determined that the ash greater than or equal to a specified amount is deposited on the filter. In addition, in the device disclosed in Patent Document 1, in a case where it is determined that the ash greater than or equal to the specified amount is deposited, a warning is issued that the filter needs to be cleaned.

In the device disclosed in Patent Document 1, whether or not the regeneration operation is necessary is determined as follows. That is, in the device disclosed in Patent Document 1, it is determined that the regeneration operation is necessary in a case where a value corresponding to a deposition amount, which is obtained based on a differential pressure between an upstream-side pressure value and a downstream-side pressure value of the filter, an exhaust flow rate, and an exhaust gas temperature, reaches a predetermined value.

CITATION LIST

Patent Document

[Patent Document 1]
Japanese Unexamined Patent Application, First Publication No. 2009-138704

SUMMARY OF INVENTION

Technical Problem

In the device disclosed in Patent Document 1, it is determined that the filter needs to be cleaned in a case where the interval for performing the regeneration operation is shortened. However, a rate at which the ash is deposited on the filter varies depending on how a vehicle is used. In addition, the interval for performing the regeneration operation also varies depending on how the vehicle is used. Therefore, there is a problem in that, depending on how the vehicle is used, there may be a case where a timing at which cleaning of the filter should be performed cannot be appropriately determined.

The present disclosure has been made to solve the above-described problems, and an object of the present disclosure is to provide a treatment device, a treatment method, and an exhaust gas treatment system capable of appropriately determining a timing at which cleaning of a filter should be performed.

Solution to Problem

A treatment device according to the present disclosure includes an acquisition unit configured to acquire regeneration information, which is information related to a regeneration interval of a filter that collects a particulate matter in an exhaust gas of an engine, and ash information, which is information indicating an estimated value of a deposition amount of ash deposited on the filter, a determination unit configured to determine whether or not the filter needs to be cleaned based on the regeneration information and the estimated value indicated by the ash information, and a notification unit configured to issue a notification that the filter needs to be cleaned in a case where it is determined that the filter needs to be cleaned.

Advantageous Effects of Invention

According to the treatment device, the treatment method, and the exhaust gas treatment system of the present disclosure, a timing at which cleaning of the filter should be performed can be appropriately determined.

DESCRIPTION OF EMBODIMENTS

Hereinafter, an embodiment of the present disclosure will be described with reference to the drawings. In each drawing, the same reference signs are used for the same or corresponding configurations, and the description thereof will be omitted as appropriate.

(Engine Control System 10)

Figure 1:
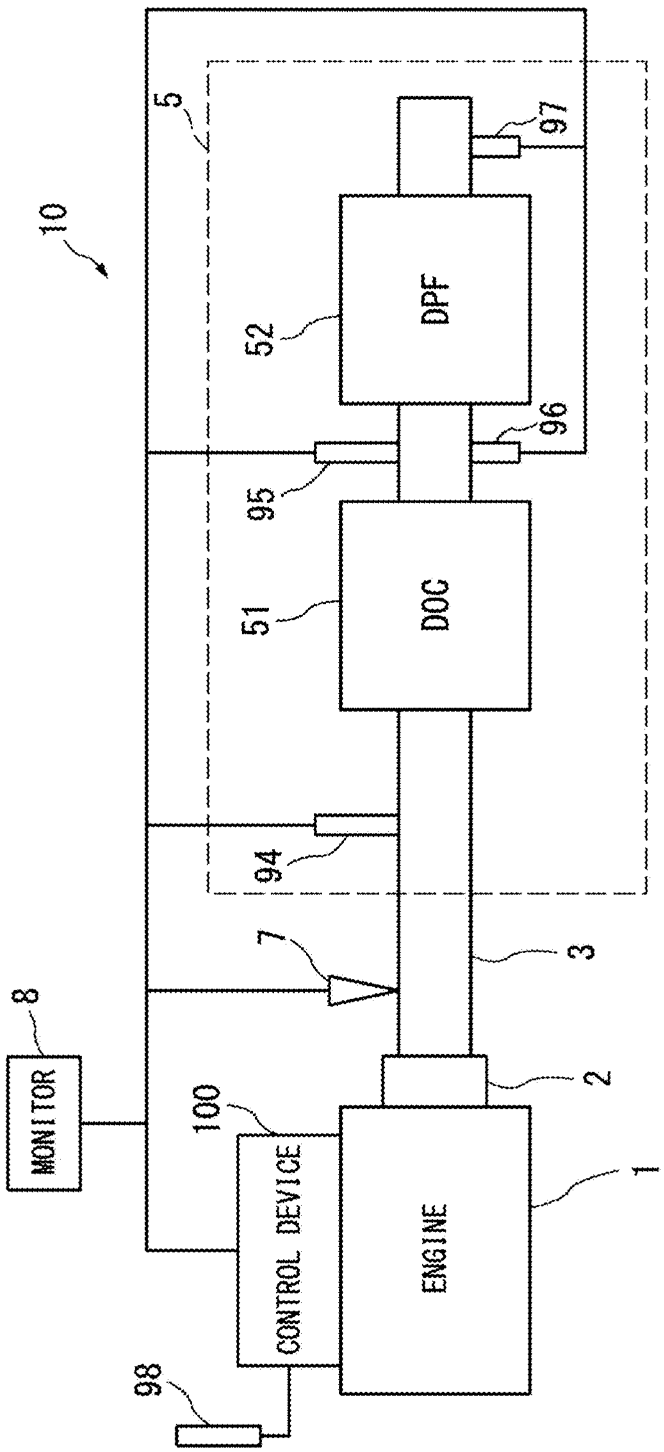
FIG. 1 is a system diagram showing a configuration example of an engine control system according to an embodiment of the present disclosure.

FIG. 1 is a system diagram showing a configuration example of an engine control system 10 as a configuration example of an exhaust gas treatment system according to the embodiment of the present disclosure. The engine control system 10 shown in FIG. 1 includes an engine 1, a turbocharger 2, an exhaust pipe 3, a DPF device 5 as a configuration example of an exhaust gas post-treatment device, a monitor 8, an HC doser 7, an atmospheric pressure sensor 98, and a control device 100. It should be noted that FIG. 1 and the like mainly show a configuration related to the DPF device 5 in the engine control system 10 (or the control device 100) according to the present embodiment, and the configurations related to other functions, such as fuel injection control, are not shown as appropriate. In addition, HC is a general term for an organic compound including carbon and hydrogen.

The engine 1 is a configuration example of an internal combustion engine and is, for example, a multi-cylinder diesel engine in the present embodiment. The turbocharger 2 is a supercharger that compresses intake air of the engine 1 by using the exhaust gas of the engine 1. The exhaust pipe 3 exhausts the exhaust gas of the engine 1 to the atmosphere through the DPF device 5.

The DPF device 5 purifies a particulate matter included in the exhaust gas of the engine 1 and includes a diesel oxidation catalyst (DOC) 51 that is provided in the exhaust pipe 3 of the engine 1 and a diesel particulate filter (DPF) 52 that collects the PM in the exhaust gas of the engine 1. In the DPF device 5, the DPF 52 is regenerated by an action of the DOC 51. In the DPF device 5, nitrogen dioxide is generated by the conversion by the DOC 51 provided upstream of the DPF 52, and soot collected downstream thereof is oxidized by the nitrogen dioxide to generate carbon dioxide, thereby removing the soot.

In addition, the DPF device 5 includes a DOC inlet temperature sensor 94 that detects an exhaust gas temperature at an inlet of the DOC 51, a DOC outlet temperature sensor 95 that detects an exhaust gas temperature at an outlet of the DOC 51, and a pair of pressure sensors 96 and 97 that detect a differential pressure between an inlet and an outlet of the DPF 52. Hereinafter, the differential pressure between the inlet and the outlet of the DPF 52 is also referred to as a DPF differential pressure or a DPF pressure loss. Detection values of the DOC inlet temperature sensor 94, the DOC outlet temperature sensor 95, and the pressure sensors 96 and 97 are output to the control device 100.

The HC doser 7 is an exhaust pipe fuel injection device that injects the fuel (HG) into the exhaust pipe 3 upstream of the DOC 51 (hereinafter, referred to as HC dosing or the like). The HC dosing using the HC doser 7 is controlled by the control device 100.

The monitor 8 includes, for example, a display panel and an input panel, and functions as a display device and an input device to display a predetermined character or image in response to an instruction of the control device 100 and output a signal in response to an input operation of a user (operator) to the control device 100.

The atmospheric pressure sensor 98 detects an atmospheric pressure and outputs a detection value to the control device 100.

In the engine control system 10 according to the present embodiment, a regeneration operation (DPF regeneration operation) is periodically performed to burn the PM deposited on the DPF 52. In the regeneration operation, the temperature of the exhaust gas or the temperature of the DOC 51 is forcibly increased. The regeneration operation is performed by, for example, burning the HC in the DOC 51 disposed upstream of the DPF 52, by post-injection for slightly mixing the fuel with the exhaust gas in the engine 1, a combination of the post-injection and the HC dosing into the exhaust pipe 3 disposed upstream of the DPF device 5 using the HC doser 7, or the HC dosing, to increase the temperature of the DPF 52.

It should be noted that, in the engine control system 10 of the present embodiment, the regeneration operation (DPF regeneration operation) includes automatic regeneration in which the regeneration is automatically performed in a normal running state (a state in which a normal operation or work can be performed without forcibly fixing an engine rotation speed or the like) in a case where a certain condition is satisfied, and stationary manual regeneration (manual regeneration) in which the regeneration is performed at any timing when the regeneration is required by the operation of the user. The stationary manual regeneration is control of stopping the normal running under the permission of the user and recovering the performance of the DPF device 5 in a case where the exhaust gas temperature is not sufficiently increased in the normal running state and the temperature of the DPF device 5 cannot be stably controlled to a target temperature. In the stationary manual regeneration, the control device 100 first informs the user of a state in which the stationary manual regeneration can be performed and requests the user to perform the stationary manual regeneration, by using the monitor 8. In this state, when the user issues an instruction to carry out the stationary manual regeneration by using the monitor 8, the control device 100 fixes the engine rotation speed at a certain rotation speed and increases the exhaust gas temperature to carry out the regeneration operation.

(Control Device 100)

Figure 2:
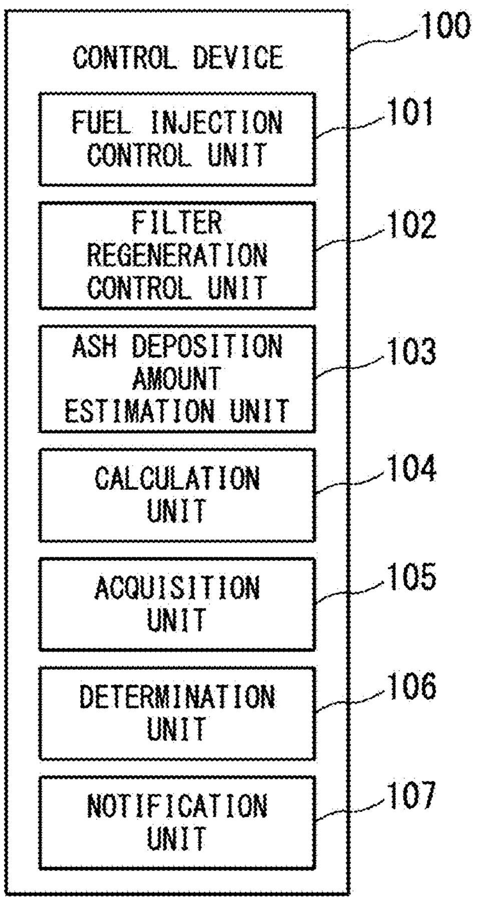
FIG. 2 is a block diagram representing a configuration example of a control device 100 shown in FIG. 1.

A configuration example and an operation example of the control device 100 shown in FIG. 1 will be described with reference to FIGS. 2 to 8. FIG. 2 is a block diagram showing a configuration example of the control device 100 shown in FIG. 1. FIGS. 3 to 7 are schematic diagrams for describing a calculation unit 104 shown in FIG. 2. FIG. 8 is a flowchart showing an operation example of the control device 100 shown in FIG. 2.

The control device 100 shown in FIG. 2 can be configured by using, for example, a computer such as a microcomputer, and peripheral circuits or peripheral devices of the computer, and includes a plurality of blocks shown in FIG. 2 as functional configurations configured by using a combination of hardware such as the computer, and software such as a program executed by the computer. In the example shown in FIG. 2, the control device 100 includes a fuel injection control unit 101, a filter regeneration control unit 102, an ash deposition amount estimation unit 103, the calculation unit 104, an acquisition unit 105, a determination unit 106, and a notification unit 107.

The fuel injection control unit 101 controls a fuel injection device (not shown) and the like of the engine 1, for example, in response to an instruction from the filter regeneration control unit 102 to perform, for example, post-injection during the regeneration operation.

The filter regeneration control unit 102 starts the regeneration operation based on the differential pressure of the DPF 52 detected by the pressure sensors 96 and 97, for example, in a case where the differential pressure exceeds a predetermined threshold value. The filter regeneration control unit 102 executes the regeneration operation, for example, as follows. For example, the filter regeneration control unit 102 performs feedback control of the DOC outlet temperature by control of the post-injection of the engine 1 and/or control of the amount of the HC dosing by the HC doser 7 such that the DOC outlet temperature matches, for example, a predetermined regeneration target temperature. It should be noted that the HC is dosed (injected) only after the DOC inlet temperature reaches a temperature (light-off temperature, for example, about 250° C.) at which a catalyst contained in the DOC 51 is activated.

In addition, the filter regeneration control unit 102 outputs regeneration information, which is information related to a regeneration interval (time interval of the regeneration operation) of the DPF 52, to the acquisition unit 105 and the like. In the present embodiment, the regeneration information is information representing a time interval or a frequency of the regeneration operation. Further, the regeneration information may include a first number of times, which is the number of times at which the regeneration interval does not exceed a predetermined time (referred to as a second time) and is within a first time shorter than the second time. Further, the regeneration information may further include a second number of times, which is the number of times at which the regeneration interval is continuously within the second time. In the following description of the operation example, as an example, the first time is set to 10 hours and the second time is set to 15 hours. In addition, the number of times (second number of times) in which the regeneration interval is 15 hours (h) or less is represented by XX, and the number of times (first number of times) in which the regeneration interval is 10 hours or less is represented by YY. XX and YY are reset, for example, when the regeneration interval is larger than 15 h or when a case where the regeneration interval is larger than 15 h is recorded a plurality of times.

The ash deposition amount estimation unit 103 estimates an ash deposition amount deposited on the DPF 52, and outputs information indicating an estimated value to the acquisition unit 105 and the like as ash information. The ash deposition amount estimation unit 103 performs, for example, DPF regeneration for the ash deposition amount estimation longer than usual, takes a difference between the DPF differential pressure at the time of the PM deposition amount of 0 g and the DPF differential pressure (initial value, set value) at the time of the ash deposition amount of 0 g, and estimates the ash deposition amount. Alternatively, the ash deposition amount estimation unit 103 estimates the ash deposition amount inside the DPF 52 based on, for example, a consumed oil amount and an ash collection rate by the DPF 52. In the present embodiment, the ash deposition amount is represented by mass per unit volume (g/L) of the DPF 52. Note that the unit of the ash deposition amount is not limited to this, and for example, mass may be used as a unit.

The calculation unit 104 calculates an allowable ash deposition amount threshold value corresponding to an allowable ash deposition amount that changes according to the atmospheric pressure. The allowable ash deposition amount that changes according to the atmospheric pressure will be described with reference to FIGS. 3 to 7. Here, the allowable ash deposition amount threshold value corresponds to a maximum value of the ash deposition amount which is allowed to maintain an exhaust pressure within a range that the engine 1 can allow, and is a value that changes according to the atmospheric pressure. In the following operation example, the allowable ash deposition amount threshold value is represented by an ash deposition amount ZZ. The allowable ash deposition amount threshold value and the ash deposition amount ZZ are examples of a third ash deposition amount threshold value in the present disclosure.

Figure 3:
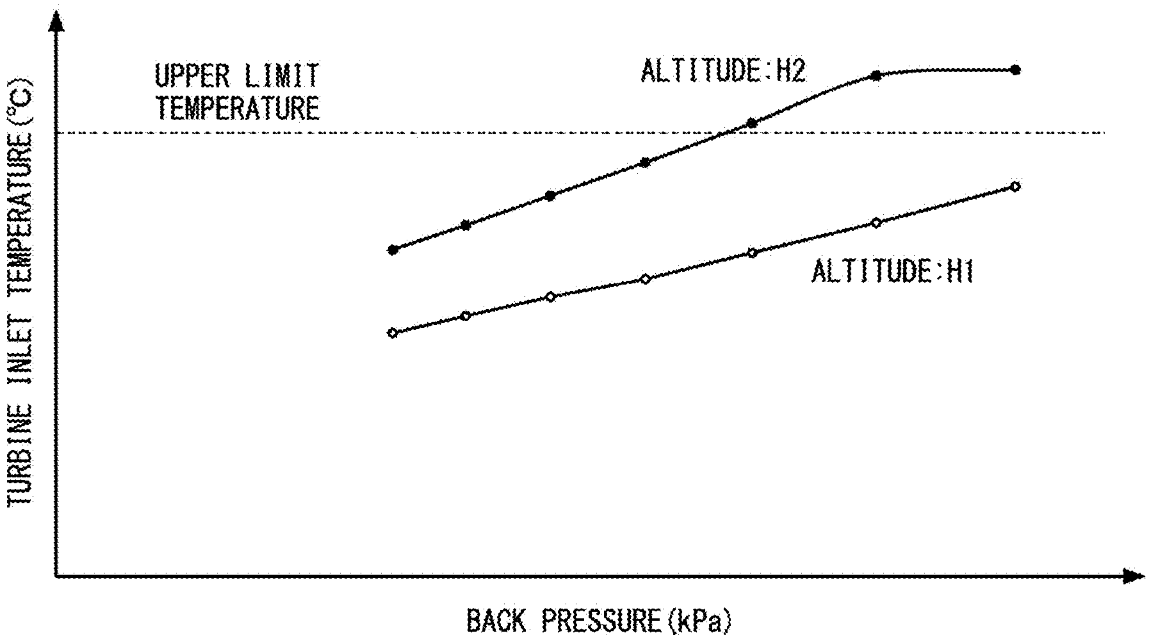
FIG. 3 is a schematic diagram for describing a calculation unit 104 shown in FIG. 2.

FIG. 3 shows an example of a correspondence relationship between a back pressure (exhaust pressure) and a turbine inlet temperature of the turbocharger 2, in which a horizontal axis is the back pressure and a vertical axis is the turbine inlet temperature, at two different altitudes H1 and H2 (H2>H1). The altitude is a running altitude of the vehicle (engine 1). An upper limit temperature is the maximum allowable temperature of the turbine inlet temperature. In the relationship shown in FIG. 3, as the altitude increases, the turbine inlet temperature increases. In addition, as the back pressure increases, the turbine inlet temperature increases. In a case of the altitude H2, as the back pressure becomes large, the turbine inlet temperature may exceed the upper limit temperature. In a case of the altitude H1, the turbine inlet temperature does not exceed the upper limit temperature even when the back pressure becomes large. In a case of the altitude H2, the back pressure at which the turbine inlet temperature reaches the upper limit temperature is an allowable back pressure (maximum allowable back pressure). This back pressure corresponds to the DPF differential pressure.

Figure 4:
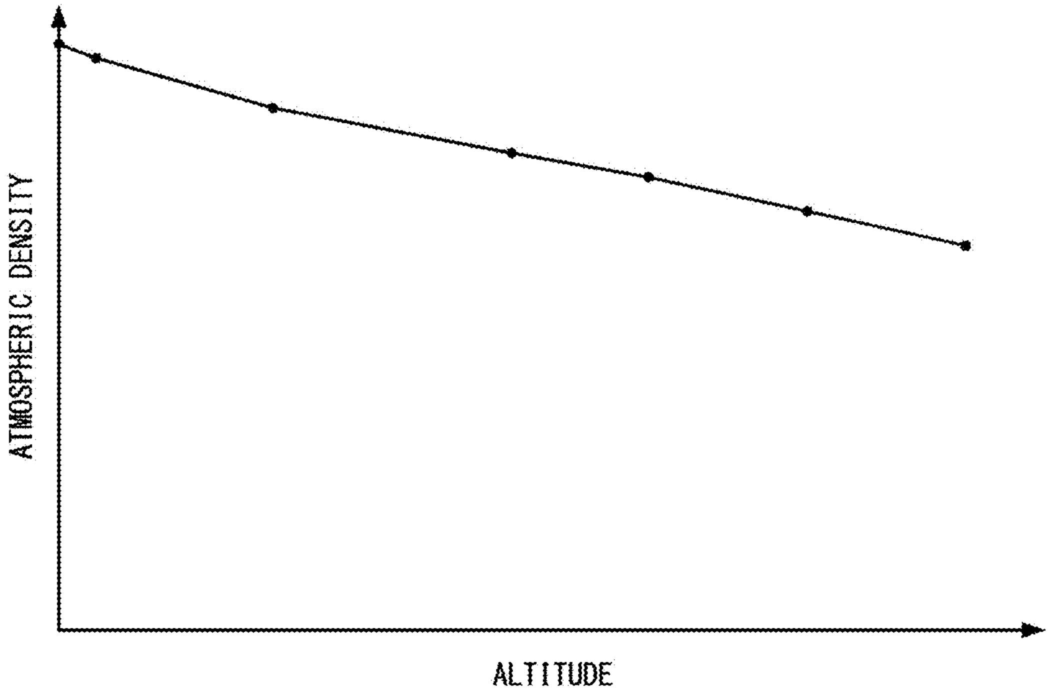
FIG. 4 is a schematic diagram for describing the calculation unit 104 shown in FIG. 2.

FIG. 4 shows an example of a correspondence relationship between the altitude and an atmospheric density, in which a horizontal axis is the altitude and a vertical axis is the atmospheric density. FIG. 4 shows that the atmospheric density decreases as the running altitude of the engine increases.

Figure 5:
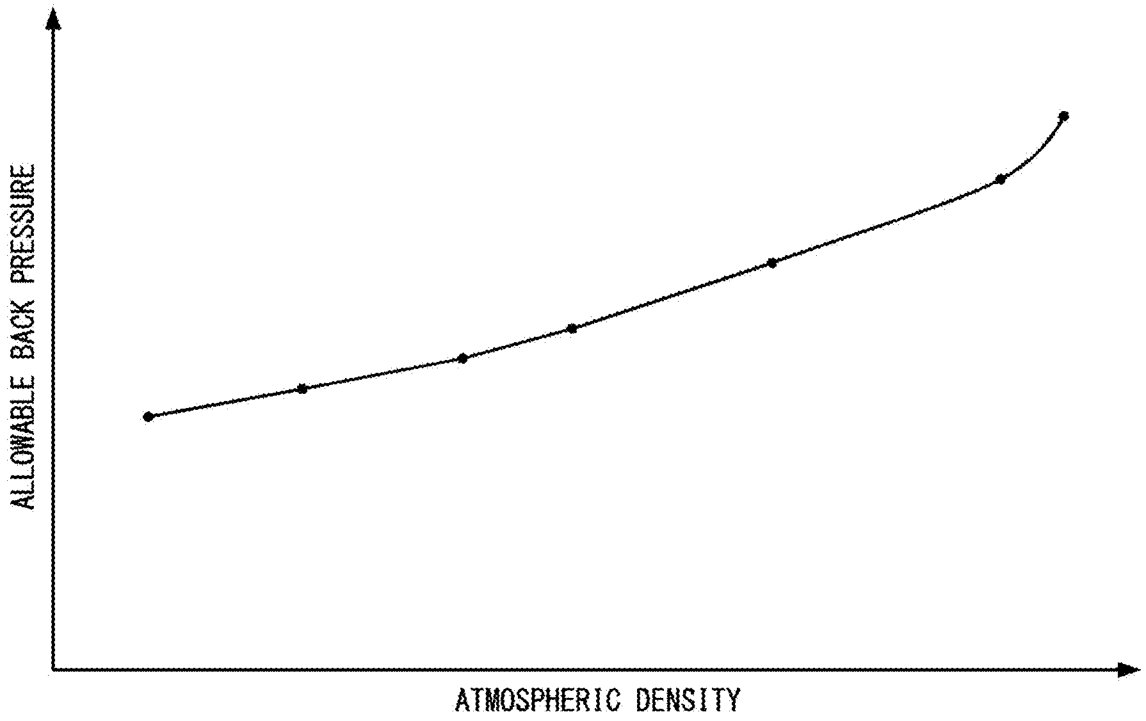
FIG. 5 is a schematic diagram for describing the calculation unit 104 shown in FIG. 2.

FIG. 5 shows a correspondence relationship between the atmospheric density and the allowable back pressure, in which a horizontal axis is the atmospheric density and a vertical axis is the allowable back pressure. FIG. 5 shows that the allowable back pressure decreases as the atmospheric density decreases (i.e., the altitude increases).

Figure 6:
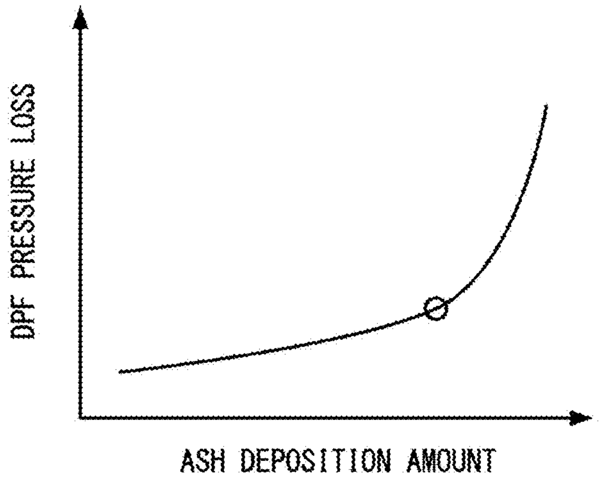
FIG. 6 is a schematic diagram for describing the calculation unit 104 shown in FIG. 2.
Figures 7, 8:
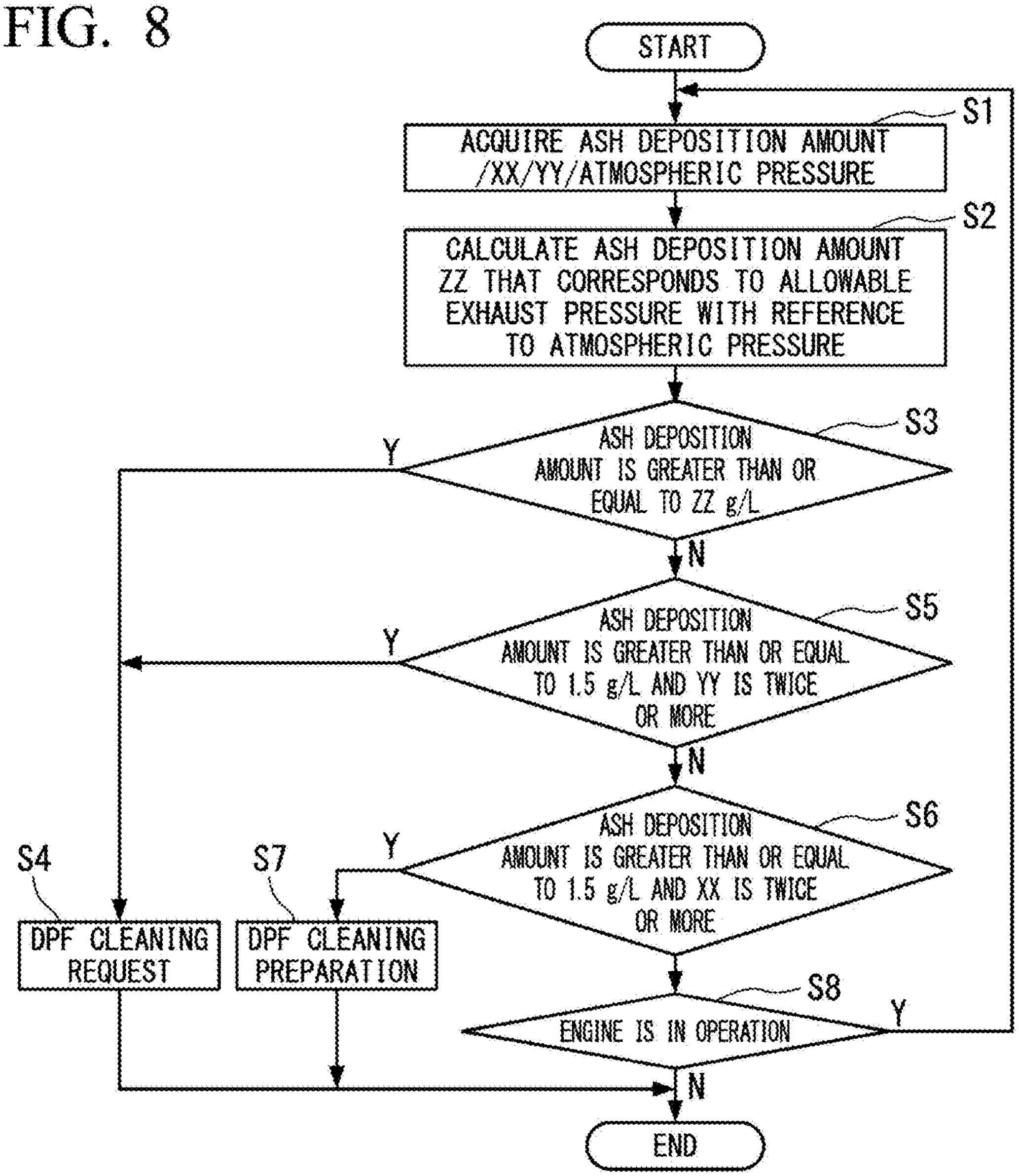
FIG. 7 is a schematic diagram for describing the calculation unit 104 shown in FIG. 2.
FIG. 8 is a flowchart showing an operation example of the control device 100 shown in FIG. 2.

FIG. 6 shows a correspondence relationship between an ash deposition amount deposited on the DPF 52 and a DPF pressure loss, in which a horizontal axis is the ash deposition amount and a vertical axis is the DPF pressure loss. With a circle mark shown in FIG. 6 as a boundary, as the ash deposition amount increases, the DPF pressure loss increases exponentially, and it becomes difficult to estimate the ash deposition amount with the DPF pressure loss. Therefore, it is required to clean the DPF before the amount of ash deposited inside the DPF becomes excessive.

From the relationships shown in FIGS. 3 to 6, the ash deposition amount that corresponds to the exhaust pressure when the turbine inlet temperature reaches the upper limit temperature at a certain atmospheric density is the maximum allowable ash deposition amount. For example, the allowable exhaust pressure in a case of the atmospheric density at the altitude of H2 shown in FIG. 3 is the back pressure (exhaust pressure) at which the turbine inlet temperature reaches the upper limit temperature, and the maximum allowable ash deposition amount corresponds to the ash deposition amount corresponding to this back pressure. In addition, the ash deposition amount that corresponds to the exhaust pressure at a rated point is the ash deposition amount ZZ.

The calculation unit 104 calculates the ash deposition amount ZZ (allowable ash deposition amount threshold value) using, for example, a table showing a correspondence relationship between the atmospheric density and the ash deposition amount (ash deposition amount ZZ) that corresponds to the allowable back pressure, as shown in FIG. 7.

The content of the table can be set based on an experimental result in a tester, a simulation result using a model simulating the tester, or the like.

The acquisition unit 105 acquires the regeneration information from the filter regeneration control unit 102, the ash information from the ash deposition amount estimation unit 103, and information indicating the atmospheric pressure from, for example, the atmospheric pressure sensor 98. The information indicating the atmospheric pressure may be acquired in such a manner that, for example, the fuel injection control unit 101 acquires the detection result of the atmospheric pressure from the atmospheric pressure sensor 98, and the fuel injection control unit 101 converts the detection result into the atmospheric density based on the temperature, and thereafter the acquisition unit 105 acquires a value of the atmospheric density from the fuel injection control unit 101 as the information indicating the atmospheric pressure.

The determination unit 106 determines whether or not the DPF 52 needs to be cleaned based on the regeneration information and the estimated value of the ash deposition amount indicated by the ash information. Alternatively, in a case where the estimated value of the ash deposition amount indicated by the ash information is greater than or equal to the allowable ash deposition amount threshold value calculated by the calculation unit 104, the determination unit 106 determines that the DPF 52 needs to be cleaned. The determination unit 106 may have, for example, a function of determining whether or not the engine 1 is in operation.

The determination unit 106 may determine a determination result of cleaning preparation, cleaning request, or cleaning unnecessity based on, for example, determination results of the following conditions 1 to 4. The cleaning preparation indicates a state in which preparation for cleaning the DPF 52 is necessary. The cleaning request indicates a state in which cleaning of the DPF 52 is necessary. The cleaning unnecessity indicates a state in which cleaning of the DPF 52 is unnecessary. In the following example, there may be a case where the cleaning request is issued while skipping the cleaning preparation.

Condition 1: the estimated value of the ash deposition amount ≥1.5 g/L. It should be noted that the 1.5 g/L is an example of a first ash deposition amount threshold value and a second ash deposition amount threshold value in the present disclosure. The first ash deposition amount threshold value and the second ash deposition amount threshold value are the same in this case, but may be different from each other.

Condition 2: the number of times XX in which the regeneration interval ≤15 h is twice or more. It should be noted that the twice is an example of a second number-of-times threshold value in the present disclosure.

Condition 3: the number of times YY in which the regeneration interval ≤10 h is twice or more. It should be noted that the twice is an example of a first number-of-times threshold value in the present disclosure.

Condition 4: the estimated value of the ash deposition amount ≥ the ash deposition amount ZZ.

Condition for cleaning preparation: condition 1: True and condition 2: True.

Condition for cleaning request: (condition 1: True and condition 3: True) or condition 4: True.

Condition for cleaning unnecessity: other than the above.

The numerical values of the ash deposition amount used in FIGS. 7 and 8 are provisional values for description, and are different from actual values.

In a case where the determination unit 106 determines that the DPF 52 needs to be cleaned, or in a case where the determination unit 106 determines that the preparation for cleaning the DPF 52 is necessary, the notification unit 107 notifies the user that the DPF 52 needs to be cleaned or the preparation for cleaning the DPF 52 is necessary, for example, using the monitor 8. The notification way is not limited to the monitor 8, and the notification unit 107 may notify that the cleaning or the preparation for the cleaning is necessary by, for example, sounding with a buzzer attached to the vehicle, lighting or blinking of a warning light, sounding of a synthetic voice, or sending a notification to a portable terminal of a user, another administrator, or the like or a computer at a remote location.

Next, the operation example of the control device 100 will be described with reference to FIG. 8. The process shown in FIG. 8 is started when the engine 1 is started. In FIG. 8, "Y" means Yes, and "N" means No. When the process shown in FIG. 8 is started, the acquisition unit 105 acquires the estimated value of the ash deposition amount, the number of times XX, the number of times YY, and the atmospheric pressure (step S1). Next, the calculation unit 104 calculates the ash deposition amount ZZ that corresponds to the allowable exhaust pressure with reference to the atmospheric pressure (step S2). Next, the determination unit 106 determines whether or not the estimated value of the ash deposition amount is greater than or equal to ZZ g/L (step S3). In a case where the estimated value of the ash deposition amount is greater than or equal to ZZ g/L (step S3: Y), the determination unit 106 determines that the DPF 52 needs to be cleaned, and the notification unit 107 issues a notification that the DPF 52 needs to be cleaned (step S4), and the process shown in FIG. 8 ends.

In a case where the condition that the estimated value of the ash deposition amount is greater than or equal to ZZ g/L is not satisfied (step S3: N), the determination unit 106 determines whether or not the estimated value of the ash deposition amount is greater than or equal to 1.5 g/L and the number of times YY is twice or more (step S5). In a case where the estimated value of the ash deposition amount is greater than or equal to 1.5 g/L and the number of times YY is twice or more (step S5: Y), the determination unit 106 determines that the DPF 52 needs to be cleaned, and the notification unit 107 issues a notification that the DPF 52 needs to be cleaned (step S4), and the process shown in FIG. 8 ends.

In a case where the condition that the estimated value of the ash deposition amount is greater than or equal to 1.5 g/L and the number of times YY is twice or more is not satisfied (step S5: N), the determination unit 106 determines whether or not the estimated value of the ash deposition amount is greater than or equal to 1.5 g/L and the number of times XX is twice or more (step S6). In a case where the estimated value of the ash deposition amount is greater than or equal to 1.5 g/L and the number of times XX is twice or more (step S6: Y), the determination unit 106 determines that the preparation for cleaning the DPF 52 is necessary, and the notification unit 107 issues a notification that the preparation for cleaning the DPF 52 is necessary (step S7), and the process shown in FIG. 8 ends.

In a case where the condition that the estimated value of the ash deposition amount is greater than or equal to 1.5 g/L and the number of times XX is twice or more is not satisfied (step S6: N), for example, the determination unit 106 determines whether or not the engine 1 is in operation (step S8). In a case where the engine 1 is in operation (step S8: Y), the process of step S1 is executed, and in a case where the engine 1 is not in operation (step S8: N), the process shown in FIG. 8 ends.

(Operations and Effects)

As described above, according to the present embodiment, it is possible to detect that the regeneration frequency is increased due to an influence of the ash deposition based on the estimated value of the ash deposition amount and the interval of the regeneration operation. Therefore, it is possible to issue a notification of an appropriate cleaning timing of the DPF 52.

In addition, based on the atmospheric pressure and the allowable temperature range, the allowable maximum DPF pressure loss (that is, ash deposition amount) is calculated, and in a case where the ash deposition amount exceeds the allowable maximum DPF pressure loss, the cleaning timing of the DPF 52 is notified. With this configuration, by changing the allowable back pressure according to the atmospheric density, the DPF 52 can be used up to an upper limit of the ash deposition amount while maintaining the upper limit of the turbine inlet temperature and protecting the engine. In addition, according to the present embodiment, it is possible to prevent an excessive pressure loss of the DPF 52 due to the ash, an increase in exhaust gas temperature of the engine, and a damage to the engine.

According to the present embodiment, a timing at which the cleaning of the DPF 52 (filter) should be performed can be appropriately determined.

In addition, according to the present embodiment, since an increase in differential pressure due to the ash and an increase in differential pressure due to the PM can be distinguished, it is possible to detect a case the regeneration frequency is increased due to the influence of the ash, and the DPF cleaning timing can be appropriately notified. In addition, by distinguishing between the ash and the PM, troubleshooting can be efficiently performed, and a vehicle stop time can be shortened. In addition, unnecessary DPF cleaning can be avoided by specifying the cause.

The embodiment of the present invention has been described with reference to the drawings. However, a specific configuration is not limited to the embodiment described above, and includes design changes and the like without departing from the gist of the present invention. For example, the exhaust gas post-treatment device is configured of the DPF device 5 in the embodiment described above, but for example, a selective catalytic reduction device (SCR device) may be further provided downstream. The values of the atmospheric density, the ash deposition amount that corresponds to the allowable back pressure, and the like are merely examples.

INDUSTRIAL APPLICABILITY

According to each aspect of the present invention, a timing at which cleaning of a filter should be performed can be appropriately determined.

REFERENCE SIGNS LIST

1: Engine
2: Turbocharger
3: Exhaust pipe
5: DPF device
7: HC doser
51: DOC
52: DPF
94: DOC inlet temperature sensor
95: DOC outlet temperature sensor
96, 97: Pressure sensor
98: Atmospheric pressure sensor
100: Control device
101: Fuel injection control unit
102: Filter regeneration control unit
103: Ash deposition amount estimation unit
104: Calculation unit
105: Acquisition unit
106: Determination unit
107: Notification unit

The invention claimed is:

1. A treatment device comprising:

an acquisition unit configured to acquire regeneration information, which is information related to a regeneration interval of a filter that collects a particulate matter in an exhaust gas of an engine, and ash information, which is information indicating an estimated value of a deposition amount of ash deposited on the filter;

a determination unit configured to determine whether or not the filter needs to be cleaned based on the regeneration information and the estimated value indicated by the ash information; and a notification unit configured to issue a notification that the filter needs to be cleaned in a case where it is determined that the filter needs to be cleaned, wherein the regeneration information includes a first number of times, which is a number of times at which the regeneration interval does not exceed a predetermined second time and is within a first time shorter than the second time, and the determination unit determines that the filter needs to be cleaned in a case where the estimated value is greater than or equal to a predetermined first ash deposition amount threshold value and the first number of times is greater than or equal to a predetermined first number-of-times threshold value, wherein the regeneration information further includes a second number of times, which is a number of times at which the regeneration interval is continuously within the second time, the determination unit further determines that preparation for cleaning the filter is necessary in a case where the estimated value is greater than or equal to a predetermined second ash deposition amount threshold value and the second number of times is greater than or equal to a predetermined second number-of-times threshold value, and the notification unit further issues a notification that the preparation for cleaning the filter is necessary in a case where it is determined that the preparation for cleaning the filter is necessary.

2. A treatment device comprising:

an acquisition unit configured to acquire regeneration information, which is information related to a regeneration interval of a filter that collects a particulate matter in an exhaust gas of an engine, and ash information, which is information indicating an estimated value of a deposition amount of ash deposited on the filter;

a determination unit configured to determine whether or not the filter needs to be cleaned based on the regeneration information and the estimated value indicated by the ash information; and a notification unit configured to issue a notification that the filter needs to be cleaned in a case where it is determined that the filter needs to be cleaned, wherein the acquisition unit further acquires information indicating an atmospheric pressure, the regeneration information includes a first number of times, which is a number of times at which the regeneration interval does not exceed a predetermined second time and is within a first time shorter than the second time, and a second number of times, which is a number of times at which the regeneration interval is continuously within the second time, the treatment device further comprises a calculation unit configured to calculate an allowable ash deposition amount threshold value corresponding to an allowable ash deposition amount that changes according to the atmospheric pressure, the determination unit determines that the filter needs to be cleaned in a case where the estimated value is greater than or equal to a predetermined first ash deposition amount threshold value and the first number of times is greater than or equal to a predetermined first number-of-times threshold value, determines that preparation for cleaning the filter is necessary in a case where the estimated value is greater than or equal to a predetermined second ash deposition amount threshold value and the second number of times is greater than or equal to a predetermined second number-of-times threshold value, and determines that the filter needs to be cleaned in a case where the estimated value is greater than or equal to the allowable ash deposition amount threshold value, and the notification unit issues a notification that the filter needs to be cleaned in a case where it is determined that the filter needs to be cleaned, and issues a notification that the preparation for cleaning the filter is necessary in a case where it is determined that the preparation for cleaning the filter is necessary.

3. A treatment device comprising:

an acquisition unit configured to acquire regeneration information, which is information related to a regeneration interval of a filter that collects a particulate matter in an exhaust gas of an engine, and ash information, which is information indicating an estimated value of a deposition amount of ash deposited on the filter;

a determination unit configured to determine whether or not the filter needs to be cleaned based on the regeneration information and the estimated value indicated by the ash information; and a notification unit configured to issue a notification that the filter needs to be cleaned in a case where it is determined that the filter needs to be cleaned, wherein the determination unit further determines that the filter needs to be cleaned in a case where the estimated value is greater than or equal to a third ash deposition amount threshold value which is set according to an atmospheric pressure.

4. The treatment device according to claim 1, wherein the determination unit further determines that the filter needs to be cleaned in a case where the estimated value is greater than or equal to a third ash deposition amount threshold value which is set according to an atmospheric pressure.

5. The treatment device according to claim 2, wherein the determination unit further determines that the filter needs to be cleaned in a case where the estimated value is greater than or equal to a third ash deposition amount threshold value which is set according to an atmospheric pressure.

* * * * *